(12) United States Patent
Hoeber et al.

(10) Patent No.: US 10,330,809 B2
(45) Date of Patent: Jun. 25, 2019

(54) DEVICE AND METHOD FOR OPTIMIZATION OF 4D AND 3D SEISMIC DATA

(71) Applicant: CGG Services SA, Massy (FR)

(72) Inventors: Henning Hoeber, East Grinstead (GB); Adel Khalil, Aberdeen (GB); Erik Hicks, Hoevik (NO)

(73) Assignee: CGG SERVICES SAS, Massy (FR)

( * ) Notice: Subject to any disclaimer, the term of this patent is extended or adjusted under 35 U.S.C. 154(b) by 237 days.

(21) Appl. No.: 14/888,168

(22) PCT Filed: Apr. 30, 2014

(86) PCT No.: PCT/EP2014/058860
§ 371 (c)(1),
(2) Date: Oct. 30, 2015

(87) PCT Pub. No.: WO2014/177633
PCT Pub. Date: Nov. 6, 2014

(65) Prior Publication Data
US 2016/0109597 A1      Apr. 21, 2016

Related U.S. Application Data

(60) Provisional application No. 61/818,004, filed on May 1, 2013.

(51) Int. Cl.
*G01V 1/38* (2006.01)
*G01V 1/36* (2006.01)
(Continued)

(52) U.S. Cl.
CPC .............. *G01V 1/364* (2013.01); *G01V 1/308* (2013.01); *G01V 2210/32* (2013.01); *G01V 2210/56* (2013.01); *G01V 2210/6122* (2013.01)

(58) Field of Classification Search
CPC ... G01V 1/28; G01V 1/30; G01V 1/36; G01V 1/33
See application file for complete search history.

(56) References Cited

U.S. PATENT DOCUMENTS

| 6,906,982 | B2 | 6/2005 | Calvert | |
|---|---|---|---|---|
| 2003/0218938 | A1* | 11/2003 | Calvert | G01V 1/364 367/16 |
| 2011/0038228 | A1* | 2/2011 | Ligtendag | G01V 1/36 367/24 |

FOREIGN PATENT DOCUMENTS

EP      1 865 340 A1      12/2007

OTHER PUBLICATIONS

International Search Report issued in corresponding International application No. PCT/EP2014/058860, date of completion of the International search Jan. 20, 2015.
(Continued)

*Primary Examiner* — Brian Turner
(74) *Attorney, Agent, or Firm* — Patent Portfolio Builders PLLC (57) ABSTRACT

A method and apparatus for noise attenuation. The method includes receiving seismic data associated with at least two vintages ($d_i$, $d_j$) collected for a same subsurface, wherein the first and second vintages ($d_i$, $d_j$) are taken at different times; calculating a set of filters ($f_i$, fj) that minimizes an energy function (E), wherein the energy function (E) includes a term representing a 4D difference between the first and second vintages ($d_i$, $d_j$); calculating primaries ($p_i$, $p_j$) corresponding to the first and second vintages ($d_i$, $d_j$) based on the set of ($f_i$, fj); and calculating a 4D difference ($\Delta_{ij}$) based on the primaries ($p_i$, $p_j$). The 4D difference ($\Delta_{ij}$) is minimized.

20 Claims, 9 Drawing Sheets

(51) Int. Cl.
*G01V 1/28* (2006.01)
*G01J 1/36* (2006.01)
*G01V 1/30* (2006.01)

(56) References Cited

OTHER PUBLICATIONS

Written Opinion of the International Searching Authority in corresponding International application No. PCT/EP2014/058860, dated Jan. 30, 2015.
Guitton, A. et al., "Adaptive subtraction of multiples using the L1•norm," Geophysical Prospecting, vol. 52: pp. 27-38, Jan. 2004, doi: 10.1046/j.1365•2478.2004.00401.x.
Office Action in European Application No. 14 724 029.5 dated Jul. 17, 2018.

* cited by examiner

DEVICE AND METHOD FOR OPTIMIZATION OF 4D AND 3D SEISMIC DATA

CROSS REFERENCE TO RELATED APPLICATIONS

This application is a 371 of International Application No. PCT/EP2014/058860, filed on Apr. 30, 2014, for "Device and Method for Optimization of 4D and 3D Seismic Data," and claims priority and benefit from U.S. Provisional Patent Application No. 61/818,004, filed May 1, 2013, for "Simultaneous Optimization for 4D and 3D Seismic Data," the entire contents of which is incorporated in its entirety herein by reference.

BACKGROUND

Technical Field

Embodiments of the subject matter disclosed herein generally relate to methods and systems for eliminating noise from seismic data acquired at different times at the same location (4D seismic surveys), thereby achieving a clearer image of real changes occurring in the subsurface over time.

Discussion of the Background

A widely used technique for searching for oil or gas is the seismic exploration of subsurface (i.e., geophysical structure). Seismic exploration consists of generating seismic waves directed toward the subsurface, gathering data on reflections of the generated seismic waves from interfaces between layers of the subsurface, and analyzing the data to generate a profile (image) of the geophysical structure, i.e., layers of the investigated subsurface. Seismic exploration is used for exploring both land and subsurface under the sea floor.

Figure 1:
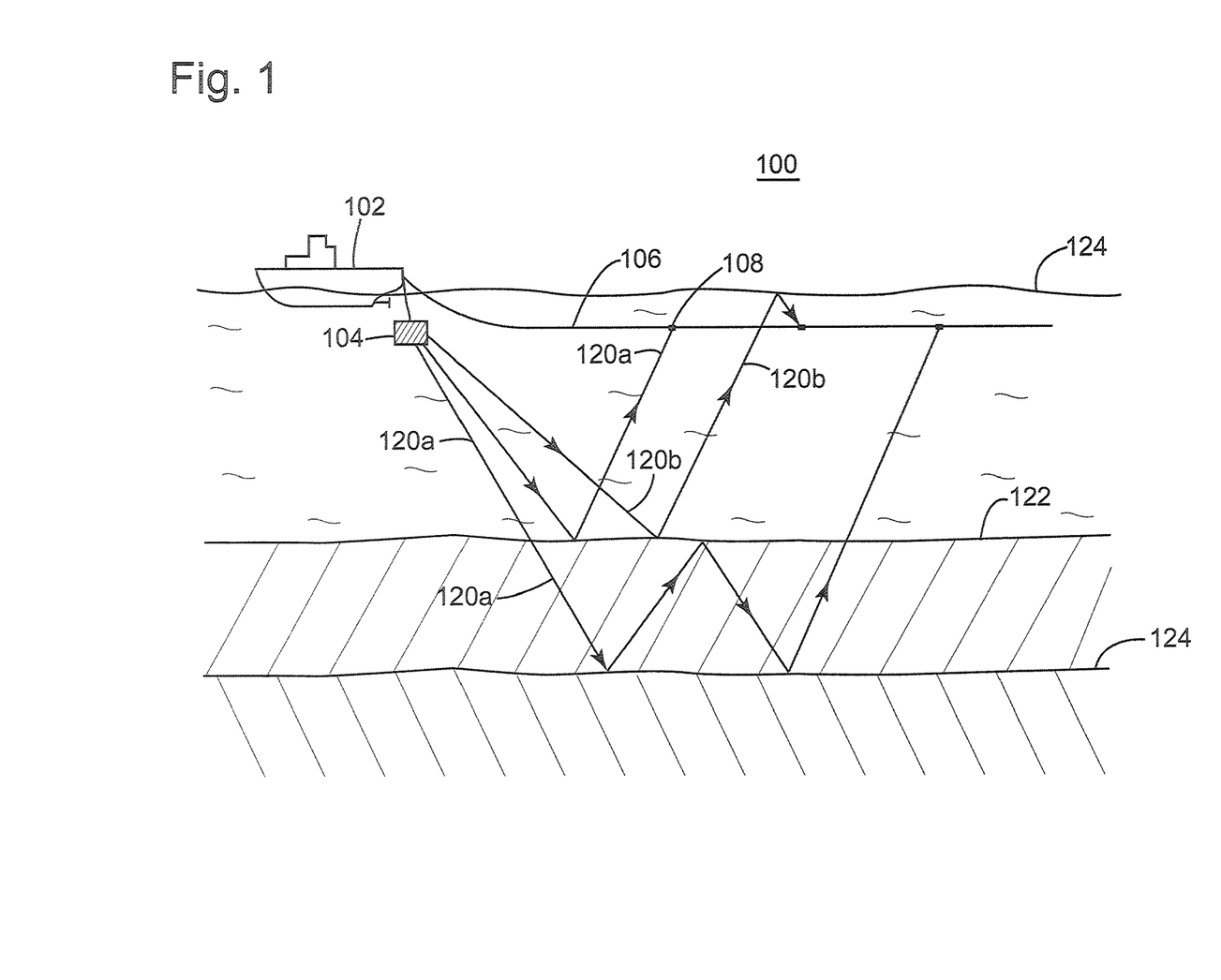
FIG. 1 is a schematic diagram of a seismic data acquisition setup.

However, collected seismic data includes noise, which may be of different types, e.g., coherent and incoherent. One example of such noise is produced by multiples. Multiples are known in the art to include waves that reflect more than once before being recorded by seismic receivers. For example, FIG. 1 shows a marine acquisition system 100 that includes a vessel 102 towing a seismic source 104 and a streamer 106. Streamer 106 has one or more seismic receivers 108. A wave 120a emitted by seismic source 104 may reflect from an interface 122 of interest and then be recorded by seismic receiver 108. However, it is also possible to emit a wave 120b that reflects a first time from the interface of interest 122 and a second time from the water surface 124 prior to be being recorded by the seismic receiver. In another example, a wave 120c is reflected from an interface not of interest 124, and then it reflects at least two more times, from the interface of interest 122 and from another interface, e.g., interface 124, before being recorded by the seismic receiver. These different waves have acquired dedicated names, for example, wave 120a is called primary, wave 120b is called ghost, and wave 120c is called multiples. While primary 120a is desired for processing, the ghost and multiples are also recorded by the seismic receivers, and these waves are considered noise, i.e., they hide the interfaces of interest.

Figure 2:
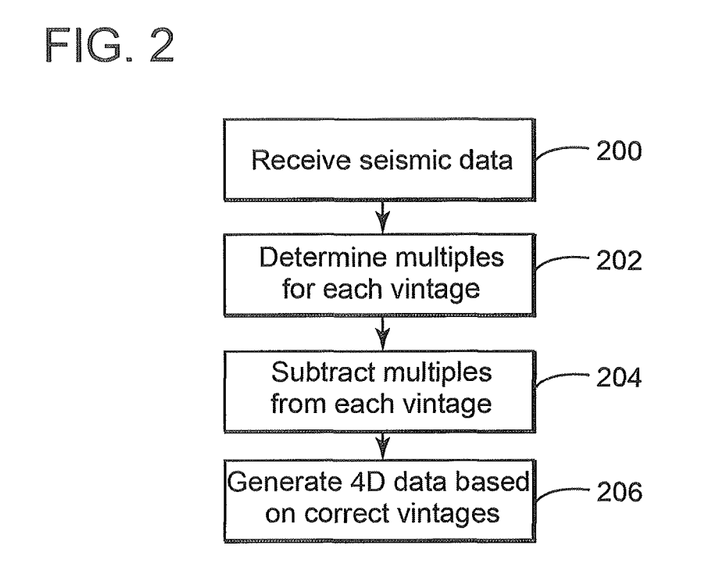
FIG. 2 is a flowchart of a method for removing multiples from the acquired seismic data.

There are traditional methods for removing multiples. Such methods may include, as illustrated in FIG. 2, a step 200 of receiving various vintages for a given subsurface, a step 202 of determining the multiples for each vintage, a step 204 of subtracting from each vintage a corresponding multiple, and a step 206 of generating 4D data based on the corrected vintages.

However, this method affects each vintage (i.e., 3D seismic data) individually and may introduce spurious events into the 4D image of the subsurface, which is undesirable. Thus, there is a need in the industry to develop new methods that reduce the number of spurious events and also remove noise (e.g., multiples) from recorded seismic data.

SUMMARY

Various embodiments discussed next yield an enhanced image of actual changes of the surveyed subsurface by minimizing 4D differences and optimizing 3D seismic vintages while maintaining the minimized 4D differences.

According to an embodiment, there is a method for noise attenuation. The method includes receiving seismic data associated with at least two vintages ($d_i$, $d_j$) collected for a same subsurface, wherein the first and second vintages ($d_i$, $d_j$) are taken at different times; calculating a set of filters ($f_i$, $f_j$) that minimizes an energy function E, wherein the energy function E includes a term representing a 4D difference between the first and second vintages ($d_i$, $d_j$); calculating primaries ($p_i$, $p_j$) corresponding to the first and second vintages ($d_i$, $d_j$) based on the set of ($f_i$, $f_j$); and calculating a 4D difference ($\Delta_{ij}$) based on the primaries ($p_i$, $p_j$). The 4D difference ($\Delta_{ij}$) is minimized.

According to another embodiment, there is a method for denoising seismic time-lapse vintages. The method includes processing the seismic time-lapse vintages ($d_i$, $d_j$) such that the vintages subtract optimally in a time-lapse 4-dimensional (4D) sense; and simultaneously processing each seismic time-lapse vintage ($d_i$, $d_j$) to obtain minimal noise in a 3-dimensional (3D) sense.

According to still another embodiment, there is a computing device for noise attenuation and the computing device includes an interface for receiving seismic data associated with at least two vintages ($d_i$, $d_j$) collected for a same subsurface, wherein the first and second vintages ($d_i$, $d_j$) are taken at different times and a processor connected to the interface. The processor is configured to calculate a set of filters ($f_i$, $f_j$) that minimizes an energy function E, wherein the energy function E includes a term representing a 4D difference between the first and second vintages ($d_i$, $d_j$); calculate primaries ($p_i$, $p_j$) corresponding to the first and second vintages ($d_i$, $d_j$) based on the set of filters ($f_i$, $f_j$); and calculate a 4D difference ($\Delta_{ij}$) based on the primaries ($p_i$, $p_j$). The 4D difference ($\Delta_{ij}$) is minimized.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. Some of the following embodiments are discussed, for simplicity, with regard to two seismic data vintages, a base vintage and a monitor vintage. However, the embodiments to be discussed next are not limited to only two vintages or to seismic data, but may be applied to plural seismic data vintages and to other similar data.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, there is an algorithm for removing multiples from two or more vintages of a same subsurface so that the 4D difference between vintages is optimal, and it also improves the individual 3D vintages by finding common noise components which can be subtracted without adversely affecting the already-optimal 4D differences.

The algorithm includes a first step of optimally processing seismic time-lapse vintages so that the vintages subtract optimally in a (time-lapse) 4D sense, while simultaneously being optimal (having minimal noise) in a 3D sense. In processing 4D data, it often happens that operators are designed (i.e., demultiple or denoise) individually for each vintage. Thus, each vintage is individually processed to remove the multiples. Then, a 4D difference between vintages is tested to check whether it improved (e.g., by 4D subtraction or a quality control (QC) measure such as normalized root mean square (NRMS) amplitude). According to the embodiment, new operators are created that are optimal in a 4D sense, i.e., the operators are determined based on pairs of vintages, giving the best 4D difference. Realizing that the new operators that are optimal in a 4D sense may leave residual noise on the individual vintages, but that this noise by design subtracts in a 4D sense, a second processing step is applied, in which any residual remaining noise common to the vintages is subtracted from all vintages. By subtracting the residual noise (coherent or incoherent) common to the vintages, the 4D differences, already optimal, remain untouched. These concepts are now discussed in more detail.

In one possible implementation, optimal demultiple operators are generated, for example, by estimating individually on all vintages a possible multiple model (e.g., via deconvolution or surface-related multiple elimination (SRME) or any other known demultiple technique, in any possible domain). Then, operators are generated to adaptively subtract from the 4D differences of the input data, the 4D differences of the multiple models (using any possible adaptation technique in any possible domain). This results in optimal 4D differences. The operator thus created may be applied to individual vintages to modify them. In a second step, the common noise part is generated, which is subsequently subtracted from the modified base and monitor (all vintages), leaving the 4D difference unchanged, but removing residual noise/multiple energy from the individual vintages. In the simplest case, the process is achieved by creating the common part as the stack (average) of the residual multiples. Any other common part technique can be used. In one application, the same energy is subtracted from the 4D optimized vintages so that the 4D difference remains optimal throughout the process.

For illustrating the above-discussed process, a simple example is now discussed. Those skilled in the art would recognize that this example has been simplified for the sake of clarity, and the process is not limited by these simplifications. In this regard, another approach is presented later to show that other mathematical algorithms may be implemented to arrive at the same results. Also, those skilled in the art would experiment and try variations of the examples shown herein based on the same general ideas of implementing 4D adaptive subtraction and 3D vintage improvements as discussed herein.

According to an embodiment, consider a base survey b and a monitor survey m. Base survey b is considered a first survey in a series of seismic surveys of a same subsurface, and a monitor survey is considered any other survey later in time in the series. Note that the algorithm shown herein also works for two different monitors other than base and monitor surveys. The 4D adaptive subtraction process includes a step of finding an operator $O_{4D}$ that minimizes a function E, which may be defined as follows:

$$E = (b-m) - O_{4D}(b_m - m_m) \qquad (1)$$

where $b_m$ is the multiples model for the base, and $m_m$ is the multiples model for the monitor m. As noted above, the multiples model for the base and monitor may be determined with any known process. Knowing the base b and monitor m seismic data (measured with seismic sensors) and knowing the multiples models (calculated, for example, using the SRME method), it is now possible to determine the $O_{4D}$ operator based on minimizing the energy E of equation (1). Note that other functions may be designed to determine operator $O_{4D}$ and also, the model may be extended to more than two vintages. In one application, there is a single operator $O_{4D}$ for base b and monitor m. If two monitors $m_1$ and $m_2$ are selected instead of base b and monitor m, another operator O may be determined for the $m_1$ and $m_2$ pair. In other words, in one application, any pair of vintages has its own operator O.

Having found the $O_{4D}$ operator for base b and monitor m, it can be used to modify original base b and monitor m to generate new base b' (that includes the primaries and not the multiples) and new monitor m' data (that includes the primaries and not the multiples) which are optimized with respect to 4D subtractions. For example, new base b' and new monitor m' may be given by:

$$\begin{pmatrix} b' \\ m' \end{pmatrix} = \begin{pmatrix} b \\ m \end{pmatrix} - \begin{pmatrix} O_{4D} & 0 \\ 0 & O_{4D} \end{pmatrix} \begin{pmatrix} b_m \\ m_m \end{pmatrix}. \qquad (2)$$

In this way, the 4D difference between new base b' and new monitor m' is optimized and also the multiples from each vintage are reduced. However, it is also possible to subtract additional energy from the two vintages b' and m' (the same term or terms from both vintages) to further remove noise from each vintage and also to maintain the optimized 4D difference. For example, in one embodiment, it is possible to select common part c to be the stack of the residual multiple model (e.g., average) as described in:

$$c = \frac{1}{2}(b_m + m_m - O_{4D}(b_m + m_m)). \quad (3)$$

Note that common part c may have other forms, for example, a form that does not rely on the $O_{4D}$ operator. In matrix notation, equation (3) can be rewritten as:

$$\begin{pmatrix} c \\ c \end{pmatrix} = \frac{1}{2} \begin{pmatrix} 1 - O_{4D} & 1 - O_{4D} \\ 1 - O_{4D} & 1 - O_{4D} \end{pmatrix} \begin{pmatrix} b_m \\ m_m \end{pmatrix}. \quad (4)$$

Equation (4) can now be applied to new base b' and new monitor m' to obtain new optimized base b'' and new optimized monitor m'' as given by equation:

$$\begin{pmatrix} b'' \\ m'' \end{pmatrix} = \begin{pmatrix} b' \\ m' \end{pmatrix} - \frac{1}{2} \begin{pmatrix} 1 - O_{4D} & 1 - O_{4D} \\ 1 - O_{4D} & 1 - O_{4D} \end{pmatrix} \begin{pmatrix} b_m \\ m_m \end{pmatrix} \quad (5)$$
$$= \begin{pmatrix} b \\ m \end{pmatrix} - \frac{1}{2} \begin{pmatrix} 1 + O_{4D} & 1 - O_{4D} \\ 1 - O_{4D} & 1 + O_{4D} \end{pmatrix} \begin{pmatrix} b_m \\ m_m \end{pmatrix}.$$

Those skilled in the art would recognize that new optimized base b'' and monitor m'' are simultaneously optimal for the 4D seismic data and also for each 3D vintage. In other words, the above-described process is a two-step procedure to optimally process seismic time-lapse vintages so that the vintages subtract optimally in a (time-lapse) 4D sense, while simultaneously being optimal (having minimal noise) in a 3D sense.

Another embodiment that illustrates a similar concept is now discussed. Different notations are used herein because the method is illustrated for two vintages, $d_1$ and $d_j$. Note that these two vintages may be part of a set of many vintages and the methods discussed herein apply to any two vintages. In one application, the methods may be applied to more than two vintages, as described below, for example, in equation (7), where n vintages are considered. Conventionally, for each seismic data vintage $d_i$, subtracting the predicted multiples $M_i$ (note that capital "M" is used to indicate a matrix and lowercase "m" is used for a vector) from data $d_i$ is achieved by minimizing a cost function $E_i$ as follows:

$$E_i = \|d_i - M_i f_i\|^2 + \delta \|f_i\|^2, \quad (6)$$

where $f_i$ is a filter.

Adaptive subtraction of multiples $M_i$ from seismic data $d_i$ is achieved for each seismic data $d_i$ individually as illustrated by equation (6). However, according to a novel 4D adaptive multiple subtraction, it is possible to improve the 4D difference between various vintages as described by equation (7), i.e., to reduce multiple model leakage by introducing an extra term that minimizes the 4D difference between vintages $d_i$ and $d_j$:

$$E = \sum_{i=1}^{n} \|d_i - M_i f_i\|^2 + \lambda \sum_{i=1}^{n} \sum_{j=i+1}^{n} \|(d_i - M_i f_i) - (d_j - M_j f_j)\|^2 + \delta \|f_i\|^2, \quad (7)$$

where n is the number of vintages and λ is a constant. With the notation used in equation (7), $d_i$ may be either base b or monitor m, and $M_i$ is the model of multiples in matrix form. The extra term (second term) added to equation (7) optimizes the 4D difference between the vintages. Based on equation (7), filters $f_i$ may be calculated and applied to the various vintages to generate new optimized vintages or primaries. This process is next discussed in more detail.

Figure 3:
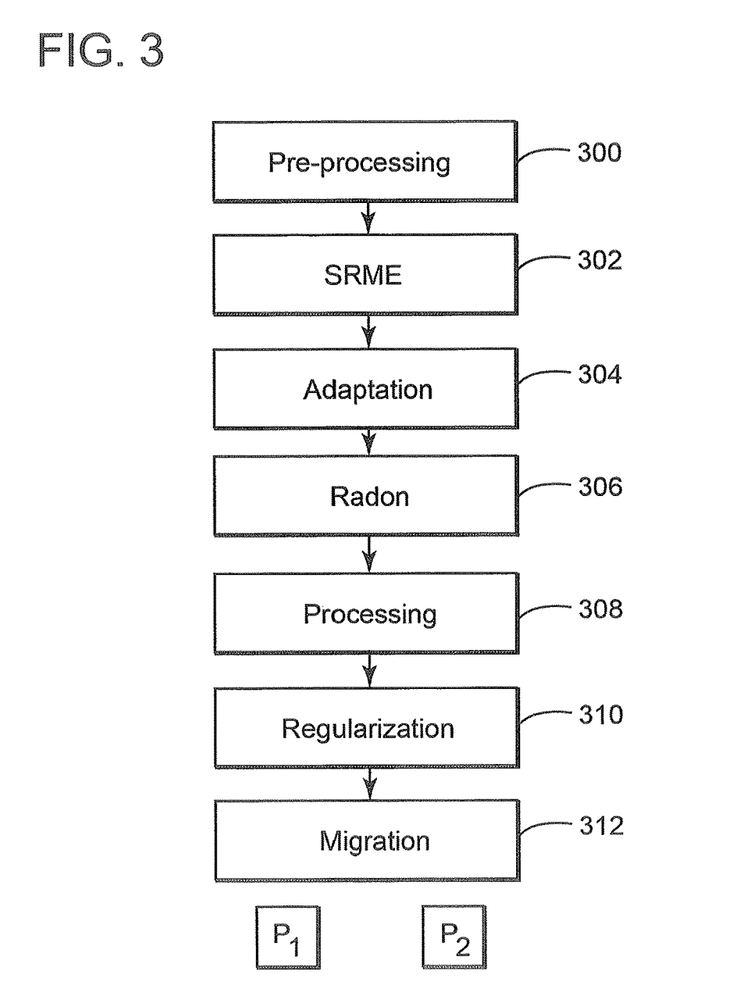
FIG. 3 is a flowchart of a method for generating primaries.

To better illustrate some differences between the novel algorithm and the traditional one, the traditional one is briefly illustrated in FIG. 3. The method includes a preprocessing step 300 during which seismic data vintages are received and prepared for processing, e.g., designature, destripping, etc. In step 302, a SRME procedure is applied to each vintage to determine corresponding multiples models $M_i$. In step 304 the multiple model is adapted to the data and subtracted. For example, equation (6) may be used to remove the multiples. A radon demultiple (or any other demultiple algorithm) may be applied in step 306 to the seismic. In step 308 the data may be further processed, e.g., random noise removal, amplitude calibration, etc. In step 310 the data is regularized, e.g., interpolated to desired positions on a grid. In step 312 the data is migrated, and the primaries $p_1$ and $p_2$ corresponding to vintages $d_1$ and $d_2$ are generated. Note that multiples may be removed from vintages not only in step 302 but also in step 306. Primaries $p_1$ and $p_2$ are supposed to be free of multiples.

Figure 4:
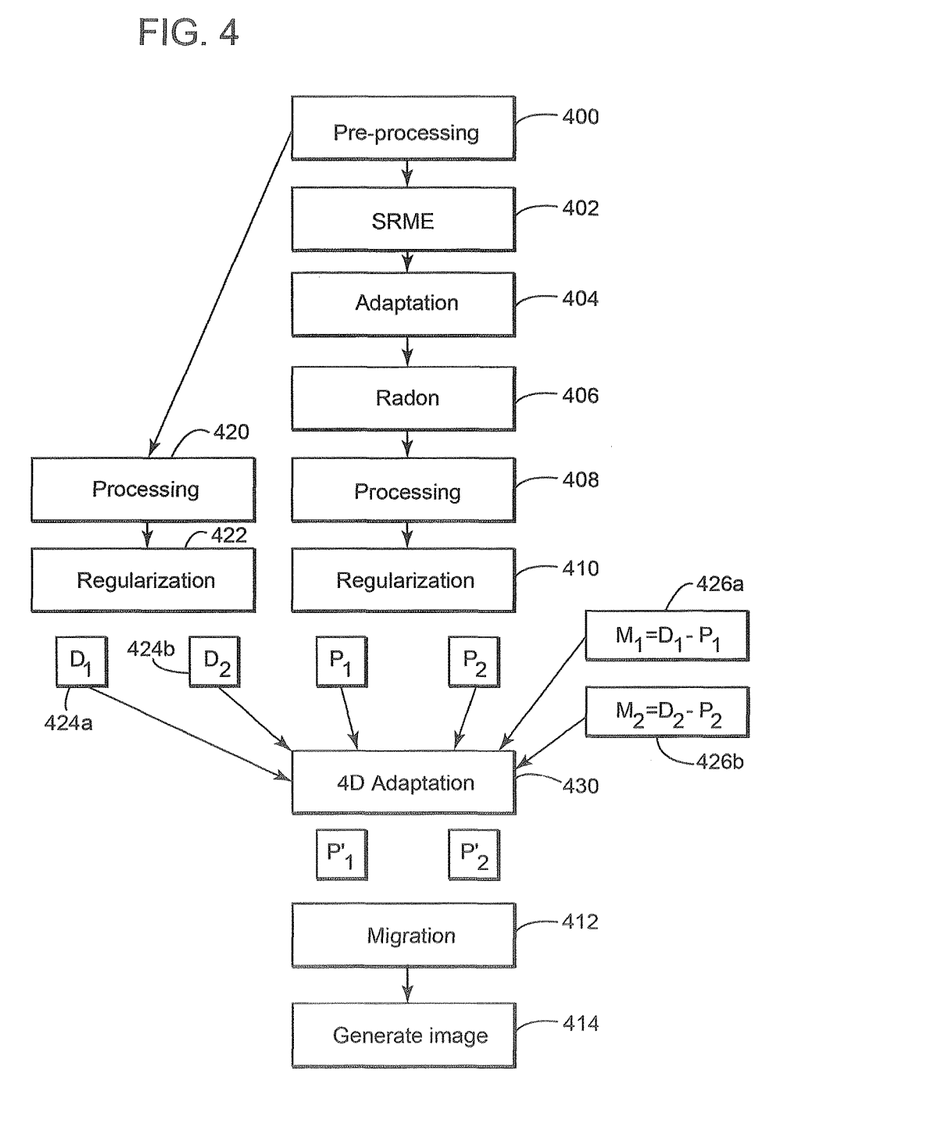
FIG. 4 is a flowchart of a method that generates primaries while minimizing 4D differences between various vintages of a same subsurface.

A novel method is discussed now with regard to FIG. 4. Steps 400 to 410 may be similar to steps 300 to 310, respectively, and for this reason their description is omitted herein. The results of step 410 are primaries $p_1$ and $p_2$, similar to those of the method illustrated in FIG. 3. However, this method has some extra steps. A step 420 may include some processing of original vintages $d_1$ and $d_2$ and a step of regularization 422, which may be similar to steps 408 and 410. A difference relative to the method illustrated in FIG. 3 is the fact that steps 420 and 422 are applied to the full seismic data $d_1$ and $d_2$ (i.e., including both primaries and multiples) so that the results of step 422 include full data $d_1$ 424a and $d_2$ 424b. A new step 430 applies 4D adaptation based on equations (1)-(5) or (7) or other equations to be discussed later. The 4D adaptation step includes determining multiples $m_1$ 426a and $m_2$ 426b by calculating differences between full data $d_1$ 424a and $d_2$ 424b and primaries p1 and p2 and then calculating new optimized primaries $p_1'$ and $p_2'$. The new optimized primaries may then be migrated in step 412, and a final image of the surveyed subsurface may be generated in step 414. This algorithm may be applied not only to seismic data, but to other kinds of data, for example, QC data. Note that the new method may be easily implemented with existing algorithms.

Figure 5:
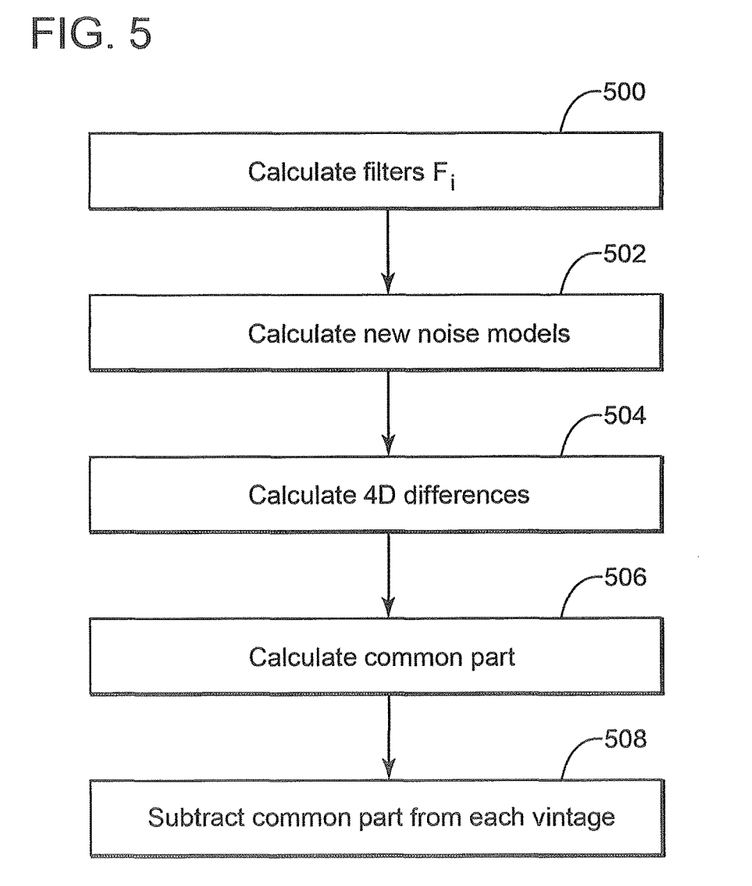
FIG. 5 is a flowchart of a method that simultaneously minimizes 4D differences between various vintages of a same subsurface while also optimizing 3D seismic data.

Step 430 of the above method is now discussed in more detail with regard to FIG. 5. According to an embodiment, energy E of equation (7) may be used to calculate filters $f_i$ for each vintage i in step 500. In step 502, new noise models $a_i$ are calculated for each vintage i. For example, it is possible to apply the matching filters $f_i$ to the initial multiple models $m_i$ to obtain new noise models as described in equation (8):

$$a_i = f_i * m_i, \quad (8)$$

where operation "*" means convolution, e.g., filter application. Primary model $p_i$ for each vintage may be calculated in step 504 by subtracting new noise models $a_i$ from total data $d_i$ as follows:

$$p_i = d_i - a_i. \quad (9)$$

Based on equation (9), the 4D differences $\Delta_{ij}$ may be calculated as:

$$\Delta_{ij} = p_i - p_j. \quad (10)$$

At this point, the 4D differences are optimized because of the calculated filters f that minimize energy E described by equation (7). To further improve each 3D vintage $p_i$ while maintaining optimized 4D differences $\Delta_{ij}$, a common part c may be calculated in step 506 and then subtracted in step 508 from each 3D vintage $p_i$. For example, common part c may be given by an average change in the noise models:

$$c = \frac{1}{n}\left(\sum_{i=1}^{n} a_i - \sum_{i=1}^{n} m_i\right). \quad (11)$$

The average change of the noise models is subtracted in step 508 from all new primary models $p_i$ to obtain new optimized primary models:

$$p_i^* = p_i - c. \quad (12)$$

The 3D primary models $p_i^*$ are now improved, as well as the 4D differences.

One or more steps discussed herein may be modified as will be recognized by those skilled in the art, and still the advantages associated with the 4D demultiple method may be achieved. For example, instead of using equation (7) to calculate the filters $f_i$, it is possible to use another equation for energy E as follows:

$$E = \sum_{i=1}^{n}\sum_{j=i+1}^{n} \|(d_i - d_j) - f_{ij}*(m_i - m_j)\|^2 \quad (13)$$

which is similar to equation (1). Elements $f_{ij}$ may then be averaged (in any possible way) to obtain filters $f_i$, e.g., $f_i = \langle f_{ij} \rangle$.

In another application, step 506 may use another common part c to further improve the 3D vintages by computing c as an average of a difference between the sum of all the new noise models $a_i$ and a quantity h:

$$c = \frac{1}{n}\left(\sum_{i=1}^{n} a_i - h\right), \quad (14)$$

where h is calculated by minimizing the 3D energy $E_{3D}$ given by:

$$E_{3D} = \left\|\sum_{i=1}^{n} d_i - g*\sum_{i=1}^{n} m_i\right\|^2 \quad (15)$$

and where h is given by:

$$h = g * \sum_{i=1}^{n} m_i, \quad (16)$$

where g in equation (16) is the matching filter that minimizes the total 3D energy $E_{3D}$.

For adaptive multiple subtraction, matching filters $f_i$ are estimated using an L2-norm method. Using the L2-norm sometimes has shortcomings, as discussed in "Adaptive subtraction of multiples using L1-norm" by Guitton, A. and Verschuur, D. J., published in 2004 in *Geophysical Prospecting*, 52, 27-38. For example, if the multiples and the primaries are not orthogonal, primaries do not have a minimum energy in the L2-norm sense, and there may be a strong primary in the original data that can be missed. To alleviate these problems, the L1-norm or hybrid norms may be used. However, these alternative types of norms are exemplary and not intended to be limiting. Those skilled in the art would understand that other norms may be used.

Figure 6:
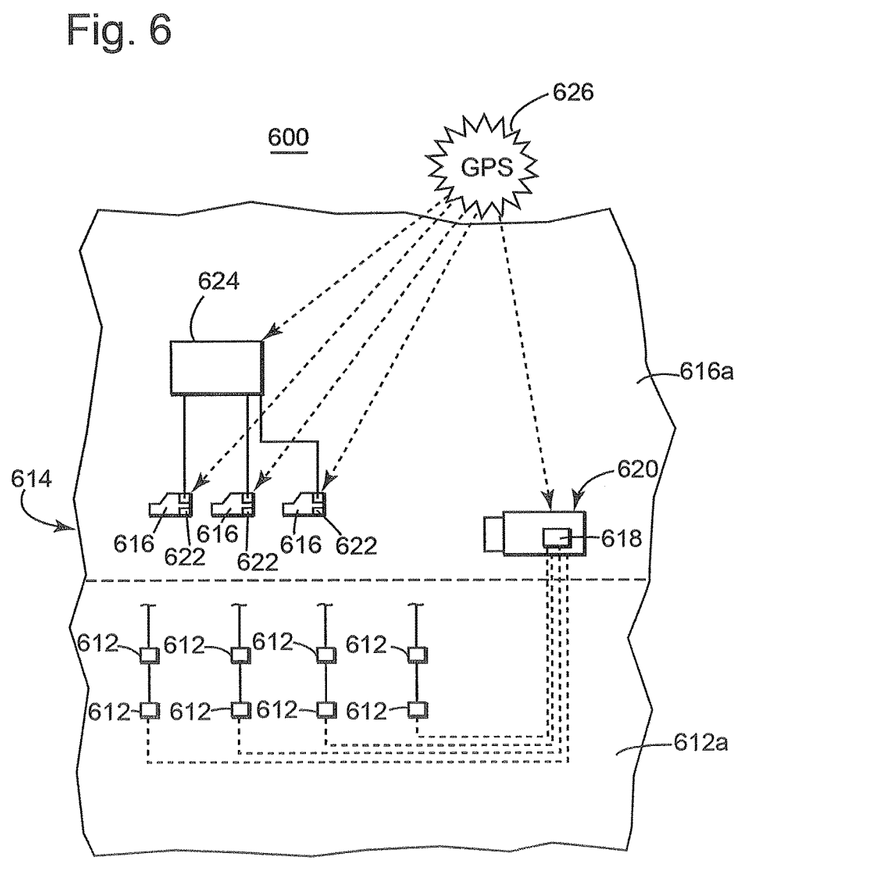
FIG. 6 is a schematic diagram of a land acquisition seismic system.

The above methods have been discussed for time-lapse seismic surveys. However, the method is also applicable to reservoir monitoring or to any other process that involves the comparison of 3D seismic surveys at two or more points in time. While the methods above have been discussed relative to a marine survey, those skilled in the art would understand that these methods may be also applied to a land survey. Such a land acquisition system for achieving 4D seismic monitoring is illustrated in FIG. 6, which shows a system 600 for the acquisition of land seismic data that includes plural receivers 612 (e.g., hydrophones, accelerometers, etc.) positioned over an area 612*a* of a subsurface to be explored and in contact with the surface 614 of the ground. A number of seismic sources 616 (e.g., vibratory elements) are also placed on surface 614 in an area 616*a* in a vicinity of receivers 612. A recording device 618 is connected to the plurality of receivers 612 and placed, for example, in a station-truck 620. Each source 616 may be composed of a variable number of vibrators, typically between 1 and 5, and may include a local controller 622. A central controller 624 may be present to coordinate the shooting times of the sources 616. A GPS system 626 may be used to time-correlate the shooting of sources 616 and data acquisition by receivers 612.

With this configuration, sources 616 are controlled to generate seismic waves, and the plurality of receivers 612 record waves reflected by oil and/or gas reservoirs and other structures. The seismic survey may be repeated at various time intervals, e.g., months or years apart, to determine changes in the reservoirs. Although repeatability of source and receiver locations is generally easier to achieve onshore, variations caused by changes in near-surface can be significantly larger than reservoir fluid displacement, making time-lapse 4D seismic acquisition and repeatability challenging.

Figure 7:
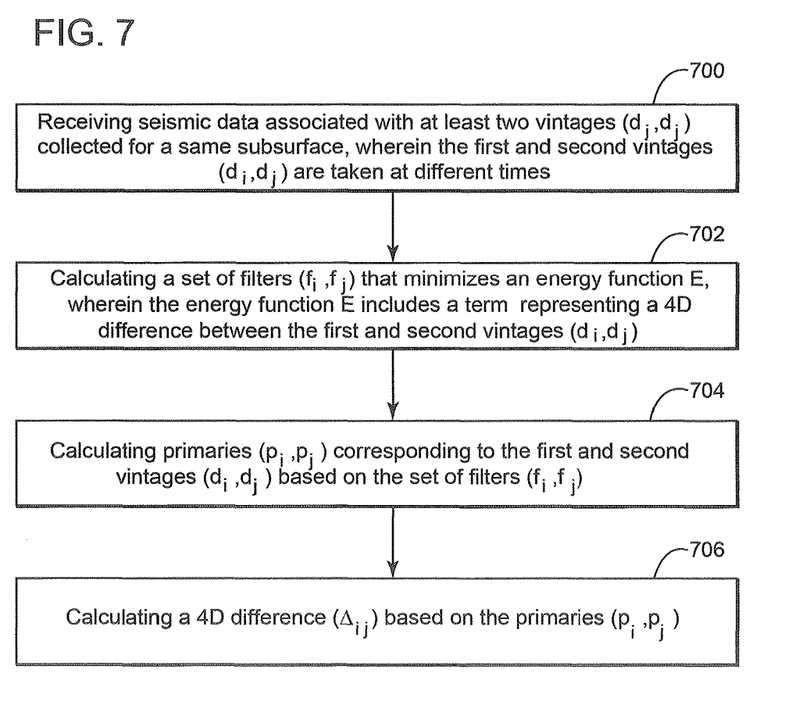
FIG. 7 is a flowchart of a method that minimizes 4D differences between various vintages of a same subsurface while also optimizing 3D seismic data.

According to an embodiment illustrated in FIG. 7, there is a method for noise attenuation. The method includes a step 700 of receiving seismic data associated with at least two vintages ($d_i$, $d_j$) collected for a same subsurface, wherein the first and second vintages ($d_i$, $d_j$) are taken at different times, a step 702 of calculating a set of filters ($f_i$, fj) that minimizes an energy function E, wherein energy function E includes a term representing a 4D difference between the first and second vintages ($d_i$, $d_j$), a step 704 of calculating primaries ($p_i$, $p_j$) corresponding to the first and second vintages ($d_i$, $d_j$)

based on the set of filters ($f_i$, fj), and a step 706 of calculating a 4D difference ($\Delta_{ij}$) based on the primaries ($p_i$, $p_j$). The 4D difference ($\Delta_{ij}$) is minimized.

Figure 8:
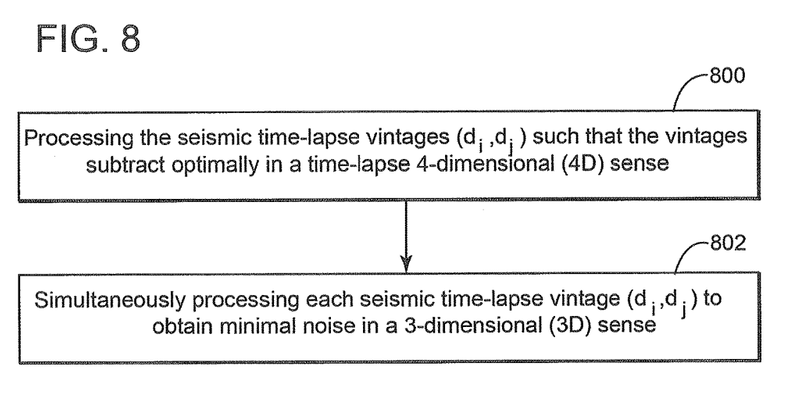
FIG. 8 is a flowchart of another method that minimizes 4D differences between various vintages of a same subsurface while also optimizing 3D seismic data.

According to another embodiment illustrated in FIG. 8, there is a method for denoising seismic time-lapse vintages. The method includes a step 800 of processing the seismic time-lapse vintages ($d_i$, $d_j$) so that the vintages subtract optimally in a time-lapse 4-dimensional (4D) sense, and a step 802 of simultaneously processing each seismic time-lapse vintage ($d_i$, $d_j$) to obtain minimal noise in a 3-dimensional (3D) sense.

Figure 9:
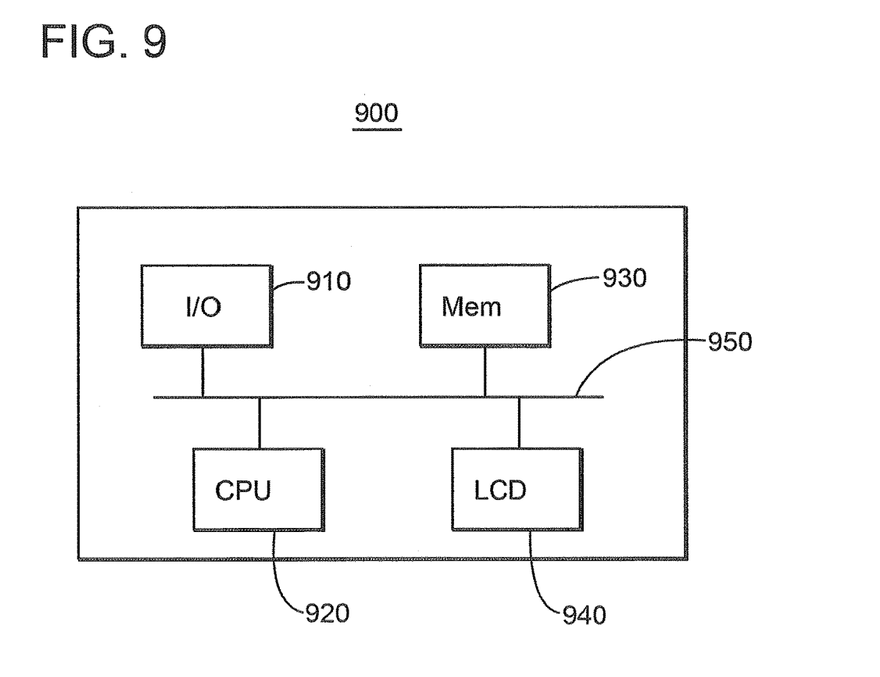
FIG. 9 is a block diagram of a seismic data analysis apparatus according to an embodiment.

The methods discussed above may be executed by a seismic data analysis apparatus 900 whose schematic diagram is illustrated in FIG. 9. The seismic data analysis apparatus 900 includes a data input interface 910 configured to receive seismic data vintages, corresponding to at least two different times, for a same surveyed area. The seismic data analysis apparatus 900 further includes a data processing unit 920 configured to execute instructions for implementing the methods discussed above, e.g., minimize an energy function and calculate filters.

The data analysis apparatus 900 may also include a memory 930, which is a computer-readable medium non-transitorily storing executable codes. When the stored executable codes are executed on the data processing unit 920 or another computer, the effect is to make the data processing unit 920 or the other computer perform a method for generating an image of a subsurface based on seismic data, such as (but not limited to) the methods discussed above. The image may be displayed on a screen 940. All these elements may be connected to each other by a bus 950, which may take many forms as are known in the art. Accordingly, the embodiments may take the form of an entirely hardware embodiment or an embodiment combining hardware and software aspects. Thus, exemplary embodiments may take the form of a computer program product (i.e., executable codes) stored on a computer-readable storage medium having computer-readable instructions embodied in the medium. Any suitable computer-readable medium may be utilized, including hard disks, CD-ROMs, digital versatile disc (DVD), optical storage devices, or magnetic storage devices such a floppy disk or magnetic tape. Other non-limiting examples of computer-readable media include flash-type memories or other known memories.

The disclosed exemplary embodiments provide a method, an apparatus and a computer-readable medium for removing noise from various vintages so that a 4D difference is improved and each 3D vintage is also denoised. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for monitoring a reservoir in a subsurface, the method comprising:
   receiving seismic data associated with a first vintage and a second vintage ($d_i$, $d_j$) collected for a same subsurface at different times;
   calculating a set of filters ($f_i$, fj) for subtracting noise from the first vintage and from the second vintage, respectively, the set of filters minimizing an energy function E, wherein the energy function E includes a term representing a 4D difference between the first vintage and the second vintage;
   calculating first primaries and second primaries ($p_i$, $p_j$) corresponding to the first vintage and to the second vintage ($d_i$, $d_j$) based on the set of filters ($f_i$, fj);
   calculating a 4D difference ($\Delta_{ij}$) based on the first primaries and the second primaries ($p_i$, $p_j$); and
   generating an image of actual changes in the subsurface between the different times, based on the 4D difference ($\Delta_{ij}$), which has been minimized, to monitor evolution of the reservoir.

2. The method of claim 1, further comprising:
   calculating a common energy (c) for the first and second vintages ($d_i$, $d_j$); and
   subtracting the common energy (c) from each of the primaries ($p_i$, $p_j$) to generate new primaries ($p_i'$, $p_j'$) that have reduced noise while maintaining the 4D difference ($\Delta_{ij}$) minimized.

3. The method of claim 2, wherein the first and second vintages ($d_i$, $d_j$) include the primaries ($p_i$, $p_j$) and noise models ($a_i$, $a_j$).

4. The method of claim 3, wherein the noise models ($a_i$, $a_j$) are calculated based on the set of filters ($f_i$, fj) and models ($m_i$, $m_j$) of multiples associated with each of the first and second vintages ($d_i$, $d_j$).

5. The method of claim 3, wherein the new primaries ($p_i'$, $p_j'$) are calculated as a corresponding difference between the first and second vintages ($d_i$, $d_j$) and the noise models ($a_i$, $a_j$).

6. The method of claim 3, wherein the common energy (c) is calculated as an average change in the noise models.

7. The method of claim 6, wherein the average change in the noise models is given by corresponding differences between the noise models ($a_i$, $a_j$) and the models ($m_i$, $m_j$) of multiples.

8. The method of claim 1, wherein the energy function E is given by:

$$E = \sum_{i=1}^{n} \|d_i - M_i f_i\|^2 + \lambda \sum_{i=1}^{n} \sum_{j=i+1}^{n} \|(d_i - M_i f_i) - (d_j - M_j f_j)\|^2 + \delta \|f_i\|^2,$$

wherein $\lambda$ is a number, n is the number of vintages, $M_i$ is a multiple model in matrix form, and $\| \|^2$ is an L2 norm.

9. The method of claim 1, wherein the energy function E is given by:

$$E = \sum_{i=1}^{n} \sum_{j=i+1}^{n} \|(d_i - d_j) - f_{ij} * (m_i - m_j)\|^2$$

wherein n is the number of vintages, $f_{ij}$ is a filter corresponding to a pair of vintages, $m_i$ is a multiple model in vector form, and $\|\ \|^2$ is an L2 norm.

10. The method of claim 9, wherein the filters ($f_i$) are given by an average of filters $f_{ij}$.

11. The method of claim 1, wherein the first and second vintages ($d_i$, $d_j$) are acquired during land seismic surveys.

12. The method of claim 1, wherein the first and second vintages ($d_i$, $d_j$) are acquired during marine seismic surveys.

13. A method for monitoring a reservoir in a subsurface and denoising seismic time-lapse vintages, the method comprising:
   simultaneously processing the seismic time-lapse vintages ($d_i$, $d_j$) such that the vintages subtract from one another optimally in a time-lapse 4-dimensional (4D) sense and each of the seismic time-lapse vintages ($d_i$, $d_j$) to minimize noise in a 3-dimensional (3D) sense yielding denoised seismic time-lapse vintages that are also optimally subtracted from one another; and
   monitoring evolution of a reservoir in the subsurface by generating an image of actual changes of the subsurface between the different times based on the denoised seismic time-lapse vintages.

14. The method of claim 13, further comprising:
   calculating an operator $O_{4D}$ that minimizes a 4D difference between the seismic time-lapse vintages ($d_i$, $d_j$); and
   applying the operator $O_{4D}$ to the seismic time-lapse vintages ($d_i$, $d_j$) to obtain respective primaries ($p_i$, $p_j$).

15. The method of claim 14, further comprising:
   calculating a common energy (c) for the seismic time-lapse vintages ($d_i$, $d_j$); and
   subtracting the common energy (c) from each of the primaries ($p_i$, $p_j$) to generate new primaries ($p_i'$, $p_j'$) that have reduced noise while maintaining the 4D difference minimized.

16. The method of claim 14, wherein the operator $O_{4D}$ minimizes expression:

($d_i$-$d_j$-$O_{4D}$($m_i$-$m_j$)), where $m_i$ and $m_j$ are models of multiples corresponding to each seismic time-lapse vintage ($d_i$, $d_j$).

17. A computing device for monitoring a reservoir in a subsurface, the computing device comprising:
   an interface for receiving seismic data associated with a first vintage and a second vintage ($d_i$, $d_j$) collected for a same subsurface at different times; and
   a processor connected to the interface and configured to,
   calculate a set of filters ($f_i$, fj) for subtracting noise from the first vintage and from the second vintage, respectively, the set of filters minimizing an energy function E, wherein the energy function E includes a term representing a 4D difference between the first vintage and the second vintage($d_i$, $d_j$);
   calculate first primaries and second primaries ($p_i$, $p_j$) corresponding to the first vintage and the second vintage ($d_i$, $d_j$) based on the set of filters ($f_i$, fj);
   calculate a 4D difference ($\Delta_{ij}$) based on the first primaries and the second primaries ($p_i$, $p_j$); and
   generate an image of actual changes in the subsurface between the different times using the 4D difference ($\Delta_{ij}$) which has been minimized, to monitor evolution of the reservoir.

18. The device of claim 17, wherein the processor is further configured to:
   calculate a common energy (c) for the first and second vintages ($d_i$, $d_j$); and
   subtract the common energy (c) from each of the primaries ($p_i$, $p_j$) to generate new primaries ($p_i'$, $p_j'$) that have reduced noise while maintaining the 4D difference ($\Delta_{ij}$) minimized.

19. The device of claim 18, wherein the first and second vintages ($d_i$, $d_j$) include the primaries ($p_i$, $p_j$) and noise models ($a_i$, $a_j$),
   wherein the noise models ($a_i$, $a_j$) are calculated based on the set of filters ($f_i$, fj) and models ($m_i$, $m_j$) of multiples associated with each of the first and second vintages ($d_i$, $d_j$),
   wherein the new primaries ($p_i'$, $p_j'$) are calculated as a corresponding difference between the first and second vintages ($d_i$, $d_j$) and the noise models ($a_i$, $a_j$), and
   wherein the common energy (c) is calculated as an average change in the noise models.

20. The device of claim 17, wherein the energy function E is given by:

$$E = \sum_{i=1}^{n} \|d_i - M_i f_i\|^2 + \lambda \sum_{i=1}^{n} \sum_{j=i+1}^{n} \|(d_i - M_i f_i) - (d_j - M_j f_j)\|^2 + \delta \|f_i\|^2,$$

wherein $\lambda$ is a number, n is the number of vintages, $M_i$ is a multiple model in matrix form, and $\|\ \|^2$ is an L2 norm.

* * * * *